(12) United States Patent
Prince et al.

(10) Patent No.: US 6,963,581 B1
(45) Date of Patent: Nov. 8, 2005

(54) METHOD AND APPARATUS FOR ADAPTIVE SERVICE INTERWORKING

(75) Inventors: Michael Prince, Ottawa (CA); Ken W. Young, Ottawa (CA); Maged E. Shaker, Ottawa (CA); Katherine Chan, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/198,067

(22) Filed: Nov. 28, 1998

(51) Int. Cl.$^7$ ............................. H04J 3/16; H04L 12/28
(52) U.S. Cl. ................... 370/465; 370/252; 370/395.2
(58) Field of Search ............................ 370/351–356, 370/465, 466, 395.2, 395.21, 395.5, 395.52, 370/395.53, 397–399, 395.1, 401–402, 395.63; 709/230, 224, 236

(56) References Cited

U.S. PATENT DOCUMENTS

| | | | | |
|---|---|---|---|---|
| 5,490,141 A | * | 2/1996 | Lai | ............................. 370/395 |
| 5,535,199 A | * | 7/1996 | Amri | ............................ 370/395 |
| 6,021,136 A | * | 2/2000 | Bharucha | .................... 370/352 |
| 6,222,842 B1 | * | 4/2001 | Sasyan | ........................ 370/466 |
| 6,222,844 B1 | * | 4/2001 | Han et al. | .................... 370/397 |
| 6,347,088 B1 | * | 2/2002 | Katou et al. | ........... 370/395.61 |
| 6,463,477 B1 | * | 10/2002 | Fontenot | ...................... 709/236 |

OTHER PUBLICATIONS

Doug, Frame relay/ATM PVC service interworking implement agreement, Apr. 14, 1995; FRF.8, pp. 1-24.*

* cited by examiner

*Primary Examiner*—Steven Nguyen

(57) ABSTRACT

A method and apparatus for adaptive service interworking include processing that begins by obtaining connection information of a receiving end-point network switch in response to receiving a setup message from a sending party. The setup message identifies a receiving party, which is operably coupled to the receiving end-point switch. Such connection information may be obtained by sending an enhanced traffic descriptor appended to the setup message and receiving an enhanced traffic descriptor that was appended to a connection message from the receiving end-point switch. The connection information is then interpreted to determine whether the receiving end-point switch is capable of supporting a transparent link. If the end-point network switch is capable of supporting the transparent link, the transparent link is established and utilized to transport data between the sending and receiving parties.

21 Claims, 3 Drawing Sheets

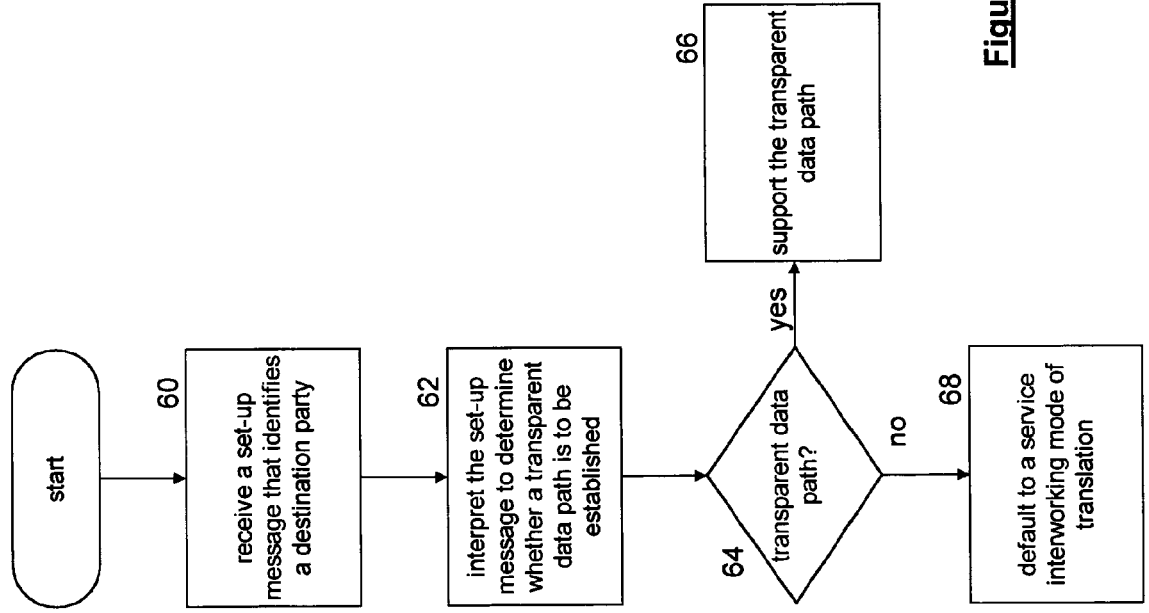

METHOD AND APPARATUS FOR ADAPTIVE SERVICE INTERWORKING

TECHNICAL FIELD OF THE INVENTION

This invention relates generally to communication switching and more particularly to adaptive service interworking.

BACKGROUND OF THE INVENTION

Communication between a calling party and a called party may be established over a communication network. Such a communication network may include a plurality of network switches that transport data in one of a variety of data transport protocols. For example, the data transport protocol may be frame relay, asynchronous transfer mode (ATM), IP (internet protocol), where frame relay includes a plurality of subset protocols. Some network switches provide for a conversion between frame relays protocols and ATM protocols. Such transformation is known as service interworking. One such switch is manufactured and sold by Newbridge Network Corporation and has a product number of 36170.

Many standards have been generated to regulate and unify data transportation via network switches. One such standard for frame relay to ATM protocol conversion is RFC 1483. The RFC 2483 standard provides a finite set of frame relay data transport protocols that can be converted to an ATM data transport protocol. As such, a problem arises when the frame relay data transport protocol being supported by an end-point switch is not listed in the RFC 1483 standard. As such, a communication, or switched virtual call (i.e., a communication between network switches), using a frame relay interface not specified in the standard cannot be supported by an ATM back bone.

Therefore, a need exists for a method and apparatus that provides a comprehensive service when frame relay to frame relay communications, or switch virtual calls, are used with any type of frame relay protocol without compromising frame relay to ATM switch virtual calls, or communications.

BRIEF DESCRIPTION OF THE DRAWINGS

FIG. 4 illustrates a logic diagram of a method for a receiving end-point switch to support a transparent link in accordance with the present invention.

DETAILED DESCRIPTION OF A PREFERRED EMBODIMENT

Generally, the present invention provides a method and apparatus for adaptive service interworking. Such processing begins by obtaining connection information of a receiving end-point network switch in response to receiving a setup message from a sending party. The setup message identifies a receiving party, which is operably coupled to the receiving end-point switch. Such connection information may be obtained by sending an enhanced traffic descriptor appended to the setup message and receiving an enhanced traffic descriptor that was appended to a connection message from the receiving end-point switch. The connection information is then interpreted to determine whether the receiving end-point switch is capable of supporting a transparent link (e.g., a link between the sending and receiving end point network switches that does not transform the data transport protocol of the end-point switches to a network data transport protocol). If the end-point network switch is capable of supporting the transparent link, the transparent link is established and utilized to transport data between the sending and receiving parties. With such a method and apparatus, a comprehensive service is provided to allow frame relay to frame relay switch virtual calls to carry any type of protocol without compromising frame relay to ATM switch virtual calls.

Figure 1:
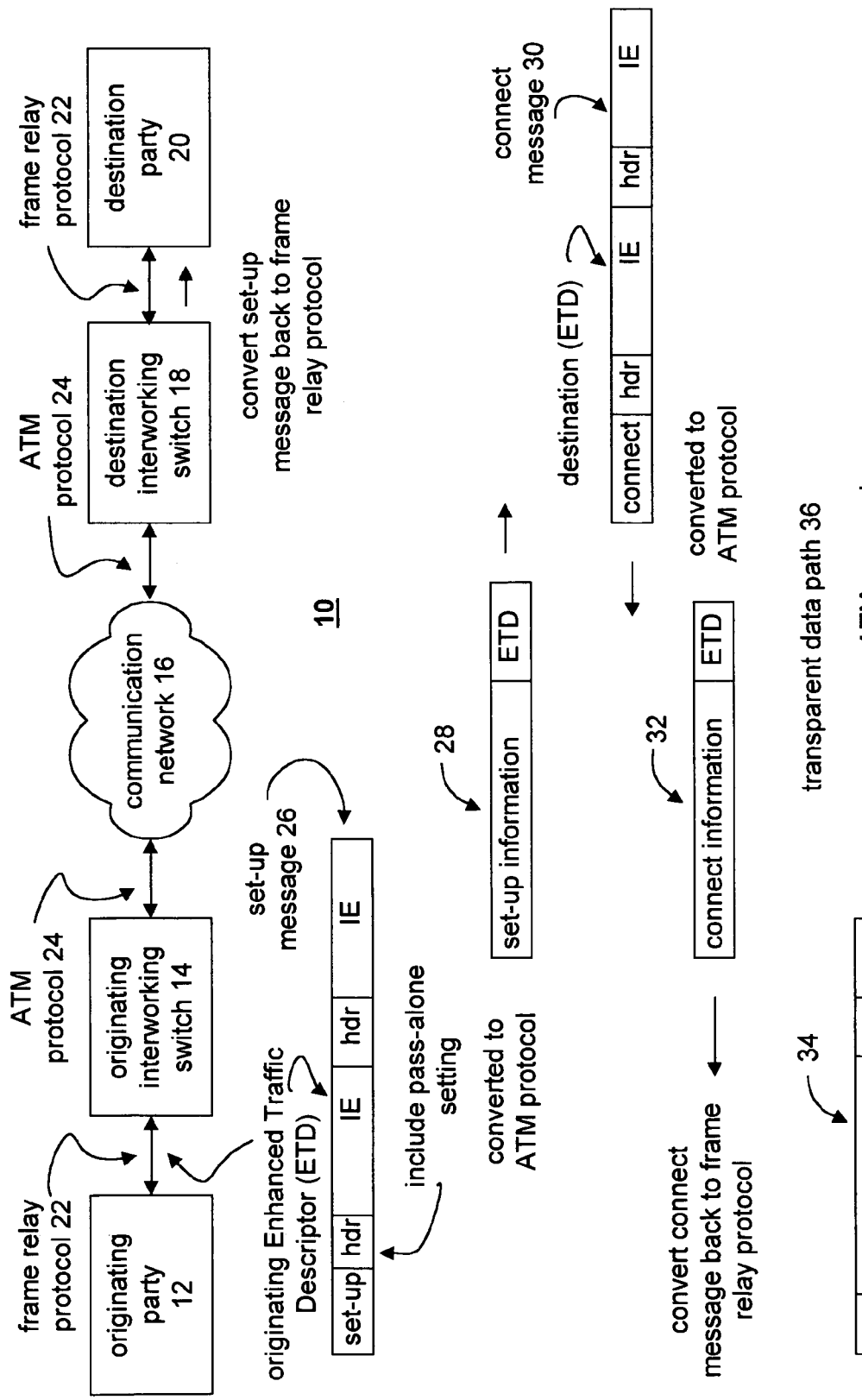
FIG. 1 illustrates a schematic block diagram of a telecommunication network in accordance with the present invention.

The present invention can be more fully described with reference to FIGS. 1 through 4. FIG. 1 illustrates a schematic block diagram of a communication network 10 that includes a sending party 12, a sending end-point switch 14, a communication network 16, a receiving end-point switch 18, and a receiving party 20. The sending and receiving parties 12 and 20 may be a router, a network coupled to a router, and/or an end user device such as a personal computer, facsimile machine, video telephone, and/or any device that receives and/or transmits data via a communication network. The end-point switches 14 and 18 may be a New Bridge Network Corporation's network switch such as the 36170 that is modified in accordance with the teachings of the present invention. Such modifications will be discussed in greater detail with reference to FIGS. 2 through 4.

To establish a communication path between the sending party 12 and the receiving party 20, the sending party sends a setup message 26 to the sending end-point switch 14. Such a setup message 26 includes setup information, headers and information elements. The setup information includes information regarding the particular type of data transport protocol the sending party is utilizing, accessing information (e.g., telephone number) of the receiving party, and identity of the sending party. For example, the sending party's data transport protocol may be frame relay, ATM, Internet protocol, etc. Upon receiving the setup message 26, the sending end-point switch 14 converts the data transport protocol into a network data transport protocol, such as an ATM protocol 24. In addition, the sending end-point switch appends a sending enhanced traffic descriptor (ETD) which identifies the data transport protocol between the sending party 12 and the sending end-point switch 14. Typically, such data transport protocol will be a particular type of frame relay protocol 22.

The sending end-point switch 14 transmits the converted ATM protocol setup message 28 via the communication network 16, which may include the public switch telephone network (PSTN), an ATM infrastructure, and/or the Internet, to the receiving end-point switch 18. The receiving end-point switch 18 converts the setup message back into a frame relay protocol 22 and provides it to the receiving party 20. In response, the receiving party generates a connection message 30, which is provided to the receiving end-point switch 18. If the receiving end-point switch is equipped to support the present invention, it appends a receiving enhanced traffic descriptor (ETD) to the connection message. In addition, the receiving end-point switch will convert the message into a network data transport protocol, such as the ATM protocol 24.

Upon receiving the ATM converted connection message 32, the sending end-point switch 14 interprets the message to identify the receiving enhanced traffic descriptor. Upon detecting the receiving enhanced traffic descriptor, the sending end-point switch establishes a transparent link between the sending party and the receiving party. A transparent link is one in which the sending end-point switch 14 and the receiving end-point switch 18 do not perform the conversion from one data transport protocol, which is used by the sending and receiving parties, to a network data transport protocol. For example, the end-point switches 14 and 18 will not perform a data transport conversion from a frame relay protocol 22 to an ATM protocol 24. The messages will be received in a frame relay format and transported to the other end-point switch in the frame relay format. Intervening switches within the communication network will receive the messages (frame relay data packets) and pass them on to the end-point switches 14 and 18. To achieve the transparent link, the non-converted data packets may need to include an identifier, which identifies that the packages are to be passed along to the end-point switches without processing. As such, when the end-point switches 14 and 18 are equipped with a setup processor, which will be discussed subsequently with reference to FIGS. 2 through 4, protocols (e.g., proprietary, older versions, etc.) not specified within the RFC 1483 specification may be utilized.

Figure 2:
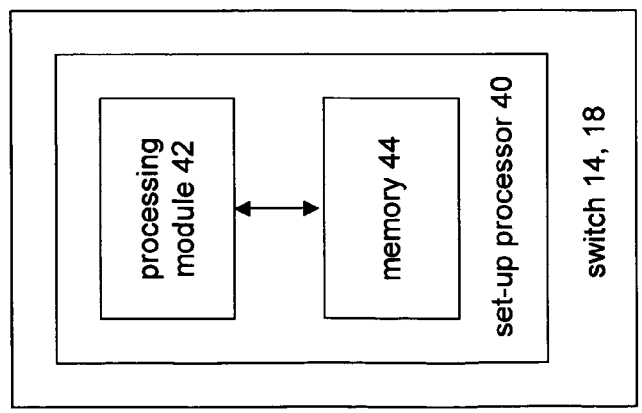
FIG. 2 illustrates a schematic block diagram of an end-point switch in accordance with the present invention.

FIG. 2 illustrates a schematic block diagram of the end-point switches 14 and 18 including a setup processor 40. The setup processor 40 includes a processing module 42 and memory 44. The processing module 42 may include a single processing entity or a plurality of processing entities. Such a processing entity may be a microprocessor, microcontroller, microcomputer, digital signal processor, central processing unit, state machine, logic circuitry, and/or any device that processes information based on operational and/or programming instructions. The memory 44 may be a single memory device or a plurality of memory devices. Such a memory device may be a read-only memory device, random access device, floppy disk, hard drive memory, CD memory, magnetic tape memory, DVD memory, and/or any device that stores digital information. Note when the processing module has one or more of its functions performed by a state machine and/or logic circuitry, the memory containing the corresponding operational instructions is embedded within the state machine and/or logic circuitry.

Figure 3:
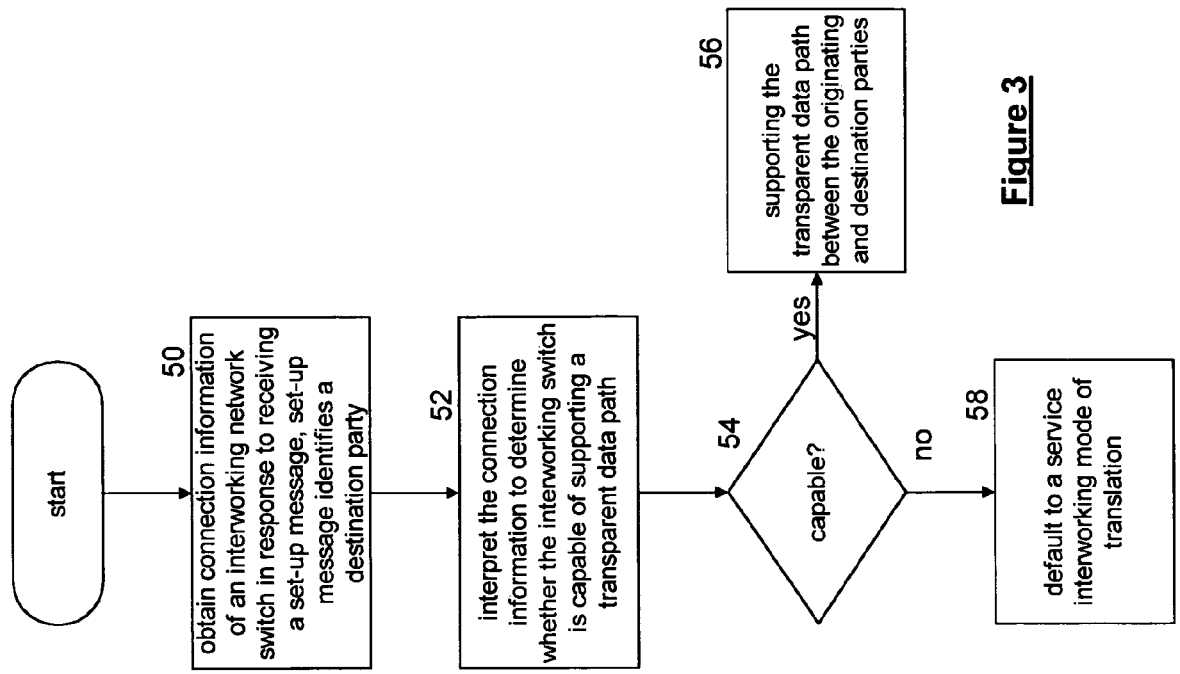
FIG. 3 illustrates a logic diagram of a method for providing a transparent link in accordance with the present invention.

The memory 44 stores programming and/or operational instructions that allow the processing module to perform the methods illustrated in FIGS. 3 and 4. FIG. 3 illustrates a logic diagram of a method for the sending end-point switch to support a transparent link. The process begins at step 50 where connection information of an end-point network switch is obtained in response to receiving a setup message from a sending party. The setup message identifies a receiving party and further includes the data transport protocol being used by the sending party. The connection information may be obtained from the end-point switch by appending a sending enhanced traffic descriptor to the setup message to create a modified setup message. The sending enhanced traffic descriptor indicates the data transport protocol of the sending party. Such a data transport protocol may be any one of the frame relay protocols. Having generated the modified setup message, it is provided through a network to the end-point switch. The end-point switch processes the sending enhanced traffic descriptor to determine whether the sending enhanced traffic descriptor is valid for the end-point network switch. In general, the sending enhanced traffic descriptor will be valid if the receiving end-point switch can interpret messages having the sending enhanced traffic descriptor. In essence, the enhanced traffic descriptors are proprietary communications between like switches (i.e., switches that include the se-up processor) to indicate when a transparent link can be established. If the receiving end-point switch has validated the sending enhanced traffic descriptor, it appends a receiving enhanced traffic descriptor to a connection response, which was generated by the receiving party. Note that the modified setup message may be translated into a network protocol (e.g., ATM) prior to sending to the end-point network switch. Further note that the connection information includes data transport protocol (e.g., frame relay, ATM, etc.) and/or a network switch type (e.g., New Bridge Network Corporation's network switch 36170).

The process then proceeds to step 52 where the connection information is interpreted to determine whether the end-point switch is capable of supporting a transparent link, which is a connection between the sending and the receiving end-point switches that does not translate the data transport protocol of the sending and receiving parties into the network data transport protocol. For example, if the sending and receiving parties are utilizing a frame relay data transport protocol, the transparent link is established without a translation into an ATM data transport protocol. As such, data is sent from the sending to the receiving party in the frame relay data transport protocol. The interpretation done by the sending end-point switch includes determining whether the connection response includes a receiving enhanced traffic descriptor. If not, the connection information is interpreted to indicate that the end-point network switch is incapable of supporting the transparent link.

The process then proceeds to step 54 where a determination is made as to whether the end-point switch is capable of supporting a transparent link. If so, the process proceeds to step 56 where the transparent link is supported between the sending and receiving party. If the end point switch is not capable of supporting the link, the process proceeds to step 58 where the network configuration is set to a default service interworking translation. For example, the default service interworking translation may be converting frame relay data transport protocol packets into ATM data transport packets. Note that the determination of whether the end-point network switches are capable of supporting the transparent link is independent of whether both the sending and receiving parties are utilizing the same frame relay data transport protocol. In such cases, the transparent link is established and the sending and receiving parties communicate to determine the particular frame relay data transport protocol to utilize. As such, the present invention allows data transport protocols that are not within the current standards to be utilized by proprietary sending and receiving parties and/or older sending and receiving party equipment.

FIG. 4 illustrates a logic diagram of a method for the receiving end-point network switch to support a transparent link. The process begins at step 60 where a setup message is received, wherein the setup message identifies the receiving party. The process then proceeds to step 62 where the setup message is interpreted to determine whether a transparent link is to be established. Such a determination may be made by extracting an enhanced traffic descriptor from the setup message, where the enhanced traffic descriptor includes identity of a data transport protocol of the sending party. Having done this, a determination is then made as to whether the data transport protocol of the receiving party is consistent with the data transport protocol of the sending party.

The process then proceeds to step 64 where a determination is made as to whether the transparent link is to be established. If so, the process proceeds to step 66, where the transparent link is supported. To support the transparent link, the receiving end-point network switch appends a receiving enhanced traffic descriptor to a connection message to produce a modified connection message. The modified connection message is then transported to the beginning, or sending, end-point network switch that is operably coupled to the sending party. Note that the modified connection message may be converted, or translated, based on a network protocol.

If, however, the transparent link is not to be established, the process proceeds to step 68. At step 68 a default interworking translation is established. Such default service interworking translation may include converting frame relay data packets into ATM data packets.

The preceding discussion has presented a method and apparatus for providing adaptive service interworking. By allowing end-point network switches to establish a transparent link, data transport protocols that are not currently included in standards may be utilized. As such, older equipment may be able to take advantage of the newer network switches as well as devices that use proprietary data transport protocols.

What is claimed is:

1. A method for adaptive service interworking, the method comprises the steps of:
   a) in response to receiving a set-up message from a sending party, obtaining connection information of an end-point network switch, wherein the set-up messages identifies a receiving party, and wherein the receiving party is operably coupled to the end-point network switch;
   b) interpreting the connection information to determine whether the end-point network switch is capable of supporting a transparent link between the sending party and the receiving party; and
   c) when the end-point network switch is capable of supporting the transparent link, supporting the transparent link between the sending party and the receiving party.

2. The method of claim 1, wherein step (a) further comprises:
   appending a sending enhanced traffic descriptor to the set-up message to create a modified set-up message;
   providing the modified set-up message to a network;
   processing, by the end-point network switch, the sending enhanced traffic descriptor to determine whether the sending enhanced traffic descriptor is valid for the end-point network switch; and
   when the sending enhanced traffic descriptor is valid, appending, by the end-point network switch, a receiving enhanced traffic descriptor to a connection response to produce a modified connection response, wherein the connection response was received from the receiving party.

3. The method of claim 2, wherein step (b) further comprises:
   when the sending enhanced traffic descriptor is invalid, providing, by the end-point network switch, the connection response; and
   when the connection response is received without the receiving enhanced traffic descriptor, interpreting the connection information to indicate that the end-point network switch is incapable of supporting the transparent link.

4. The method of claim 2 further comprises translating the modified set-up message to a network protocol prior to sending to the end-point network switch.

5. The method of claim 1, wherein the connection information further comprises at least one of: a data transport protocol and a network switch type.

6. The method of claim 5, wherein the network switch type further comprises the end-point network switch being capable of processing an enhanced traffic descriptor.

7. The method of claim 1, wherein the receiving party is at least one of: a router, a network coupled to the router, and an end-user.

8. The method of claim 1 further comprises-defaulting to service interworking translation when the end-point network switch is not capable of supporting the transparent link.

9. A method for adaptive service interworking, the method comprises the steps of:
   a) receiving a set-up message that identifies a receiving party;
   b) interpreting the set-up message to determine whether a transparent link is to be established between a sending party and the receiving party, wherein the transparent link does not transform a data transport protocol to a network data transport protocol; and
   c) when the transparent link is to be established, supporting the transparent link.

10. The method of claim 9, wherein step (b) further comprises:
    extracting an enhanced traffic descriptor from the set-up message, wherein the enhanced traffic descriptor includes identity of a data transport protocol of the sending party; and
    determining that a data transport protocol of the receiving party is consistent with the data transport protocol of the sending party.

11. A method for adaptive service interworking, the method comprises the steps of:
    a) receiving a set-up message that identifies a receiving party;
    b) interpreting the set-up message to determine whether a transparent links is to be established between a sending party and the receiving party; and
    c) when the transparent link is to be established, supporting the transparent link, appending a receiving enhanced traffic descriptor to a connection message to produce a modified connection message, and transporting the modified connection message to a beginning end network switch operably coupled to the sending party.

12. The method of claim 11 further comprises converting the modified connection message based on a network protocol.

13. A set-up processor comprises:
    a processing module; and
    memory operably coupled to the processing module, wherein the memory includes operating instructions that cause the processing module to (a) obtain connection information of an end- point network switch in response to receiving a set-up message from a sending party, wherein the set-up messages identifies a receiving party, and wherein the receiving party is operably coupled to the end-point network switch; (b) interpret the connection information to determine whether the end-point network switch is capable of supporting a transparent link between the sending party and the receiving party; and (c) support the transparent link between the sending party and the receiving party when the end-point network switch is capable of supporting the transparent link.

14. The set-up processor of claim 13, wherein the memory further comprises operating instructions that cause the processing module to:
  append a sending enhanced traffic descriptor to the set-up message to create a modified set-up message;
  provide the modified set-up message to a network; and
  receive a receiving enhanced traffic descriptor appended to a connection response when the sending enhanced traffic descriptor is valid with respect to the end-point network switch.

15. The set-up processor of claim 14, wherein the memory further comprises operating instructions that cause the processing module to:
  receive the connection response when the sending enhanced traffic descriptor is invalid with respect to the end-point network switch; and
  interpret the connection information to indicate that the end-point network switch is incapable of supporting the transparent link when the connection response is received without the receiving enhanced traffic descriptor.

16. The set-up processor of claim 14, wherein the memory further comprises operating instructions that cause the processing module to: translate the modified set-up message to a network protocol prior to sending to the end-point network switch.

17. The set-up processor of claim 13, wherein the memory further comprises operating instructions that cause the processing module to: default to service interworking translation when the end-point network switch is not capable of supporting the transparent link.

18. A set-up processor comprises:
  a processing module; and
  memory operably coupled to the processing module, wherein the memory includes operating instructions that cause the processing module to (a) receive a set-up message that identifies a receiving party; (b) interpret the set-up message to determine whether a transparent link is to be established between the sending party and the receiving party, wherein the transparent link does not transform a data transport protocol to a network data transport protocol; and (c) support the transparent link when the transparent link is to be established.

19. The set-up processor of claim 18, wherein the memory further comprises operating instructions that cause the processing module to:
  extract an enhanced traffic descriptor from the set-up message, wherein the enhanced traffic descriptor includes identity of a data transport protocol of the sending party; and
  determine that a data transport protocol of the receiving party is consistent with the data transport protocol of the sending party.

20. A set-up processor comprises:
  a processing module; and
  memory operably coupled to the processing module, wherein the memory includes operating instructions that cause the processing module to (a) receive a set-up message that identifies a receiving party; (b) interpret the set-up message to determine whether a transparent link is to be established between the sending party and the receiving party; (c) support the transparent link when the transparent link is to be established; (d) append a receiving enhanced traffic descriptor to a connection message to produce a modified connection message; and (e) transport the modified connection message to a beginning end network switch operably coupled to the sending party.

21. The set-up processor of claim 20, wherein the memory further comprises operating instructions that cause the processing module to convert the modified connection message based on a network protocol.

* * * * *